United States Patent
Bevc et al.

(10) Patent No.: US 6,625,543 B1
(45) Date of Patent: Sep. 23, 2003

(54) OUTPUT BASED AZIMUTH MOVEOUT RE-GRIDDING OF SEISMIC DATA

(75) Inventors: Dimitri Bevc, Pleasanton, CA (US); Sean E. Crawley, Katy, TX (US); Alexander M. Popovici, Portola Valley, CA (US)

(73) Assignee: 3DGeo Development, Inc., Santa Clara, CA (US)

( * ) Notice: Subject to any disclaimer, the term of this patent is extended or adjusted under 35 U.S.C. 154(b) by 0 days.

(21) Appl. No.: 10/235,877

(22) Filed: Sep. 5, 2002

(51) Int. Cl.$^7$ .............................................. G06F 19/00
(52) U.S. Cl. .............................................. 702/14; 703/5
(58) Field of Search ........................... 702/14, 17, 18, 702/5; 367/50, 52, 53

(56) References Cited

U.S. PATENT DOCUMENTS

| | | | |
|---|---|---|---|
| 4,672,545 A | 6/1987 | Lin et al. | 702/14 |
| 4,866,659 A | 9/1989 | Lin et al. | 702/14 |
| 4,878,204 A | 10/1989 | Black et al. | 367/53 |
| 5,050,129 A | 9/1991 | Schultz | 367/21 |
| 5,285,422 A | 2/1994 | Gonzalez et al. | 367/53 |
| 5,450,370 A | 9/1995 | Beasley et al. | 367/53 |
| 5,586,082 A | 12/1996 | Anderson et al. | 367/73 |
| 5,587,967 A | 12/1996 | Ferber | 367/53 |
| 5,719,822 A | 2/1998 | Wang | 367/53 |
| 5,812,963 A | 9/1998 | Schneider, Jr. et al. | 702/17 |
| 5,903,515 A | 5/1999 | Beasley et al. | 367/59 |
| 5,987,387 A | 11/1999 | Dickens et al. | 702/14 |
| 6,032,104 A | 2/2000 | De Bazelaire | 702/53 |
| 6,490,526 B2 * | 12/2002 | Matteucci et al. | 702/5 |
| 2002/0035443 A1 * | 3/2002 | Matteucci et al. | 702/155 |

OTHER PUBLICATIONS

Bagaini et al., "2–D continuation operators and their applications," *Geophysics* 61(6): 1846–1858, 1996.
Biondi et al., "3–D prestack migration of common–azimuth data," *Geophysics* 61:1822–1832, 1996.
Biondi et al., "Application of azimuth moveout to 3–D prestack imaging," *66$^{th}$ Ann. Internat. Mtg: Soc. of Expl. Geophys.*, 431–434, 1996.
Biondi et al., "Azimuth moveout for 3–D prestack imaging," *Geophysics* 63(2):574–588, 1998.
Biondi, "Azimuth moveout + common azimuth migration: cost–effective prestack depth imaging of marine data," *67$^{th}$ Ann. Internat. Mtg: Soc. of Expl. Geophys.*, 1375–1378, 1997.
Biondi, "Azimuth moveout vs. dip moveout in inhomogeneous media," *68$^{th}$ Ann. Internat. Mtg: Soc. of Expl. Geophys.*, 1740–1743, 1998.
Biondi et al., "Transformation of 3–D prestack data by azimuth moveout (AMO)," *64$^{th}$ Ann. Internat. Mtg: Soc. of Expl. Geophys.*, 1541–1544, 1994.
Chemingui, "Imaging irregularly sampled 3D prestack data," Stanford University, Department of Geophysics, Dissertation submitted Jun. 2001.
Chemingui et al., "Amplitude preserving azimuth moveout," *65$^{th}$ Ann. Internat. Mtg: Soc. of Expl Geophys.*, 1453–1456, 1995.

(List continued on next page.)

*Primary Examiner*—John Barlow
*Assistant Examiner*—Victor J. Taylor
(74) *Attorney, Agent, or Firm*—Andrei D. Popovici (57) ABSTRACT

Input seismic data are re-gridded to an arbitrary output grid by output-based azimuth moveout. An input seismic data set corresponding to an input grid is used to generate an equivalent output seismic data set corresponding to an output grid different from the input grid. Preferably, the output grid is divided into blocks, and each output grid block is assigned to one of a plurality of independent parallel processors. For each output trace corresponding to an output location, the contributions of plural input traces to the output trace are computed according to an azimuth moveout operator. The contributions are then summed into the output trace.

17 Claims, 4 Drawing Sheets

OTHER PUBLICATIONS

Chemingui et al., "Data regularization by Inversion to Common Offset (ICO)," *69th Ann. Internat. Mtg: Soc. of Expl. Geophys.*, 1398–1401, 1999.

Chemingui et al., "Equalization of irregular data by iterative inversion," *67th Ann. Internat. Mtg: Soc. of Expl. Geophys.*, 1115–1118, 1997.

Collins, "Imaging in 3–D DMO, Part I: Geometrical optics model," *Geophysics* 62(1):211–224, 1997.

Collins, "Imaging in 3–D DMO, Part II: Amplitude effects," *Geophysics* 62(1):225–244, 1997.

Fomel et al., "The time and space formulation of azimuth moveout," *65th Ann. Internat. Mtg: Soc. of Expl. Geophys.*, 1449–1452, 1995.

Fomel et al., "True amplitude DMO, offset continuation and AVA/AVO for curved reflectors," *66th Ann. Internat. Mtg: Soc. of Expl. Geophys.*, 1731–1734, 1996.

Lu et al., "Parallel implementation of 3–D DMO on shared memory systems," *64th Ann. Internat. Mtg: Soc. of Expl. Geophys.*, 214–217, 1994.

Popovici, "From prestack migration to migration to zero–offset," *64th Ann. Internat. Mtg: Soc. of Expl. Geophys.*, 680–683, 1994.

Ronen et al., "Least–squares DMO and migration," *Geophysics* 65(5):1364–1371, 2000.

Resheff et al., "Migration of common shot gathers," *Geophysics* 51:324–331, 1986.

* cited by examiner

OUTPUT BASED AZIMUTH MOVEOUT RE-GRIDDING OF SEISMIC DATA

FIELD OF THE INVENTION

This invention relates to geophysical prospecting using seismic signals, and in particular to systems and methods for re-gridding seismic data.

BACKGROUND

Effectively searching for oil and gas reservoirs often requires imaging the reservoirs using three-dimensional (3-D) seismic data. Seismic data are recorded at the earth's surface or in wells, and an accurate model of the underlying geologic structure is constructed by processing the data. 3-D seismic imaging is perhaps the most computationally intensive task facing the oil and gas industry today. The size of typical 3-D seismic surveys can be in the range of hundreds of gigabytes to tens of terabytes of data. Processing such large amounts of data often poses serious computational challenges.

Obtaining high-quality earth images necessary for contemporary reservoir development and exploration is particularly difficult in areas with complex geologic structures. In such regions, conventional seismic technology may either incorrectly reconstruct the position of geological features or create no usable image at all. Moreover, as old oil fields are depleted, the search for hydrocarbons has moved to smaller reservoirs and increasingly hostile environments, where drilling is more expensive. Advanced imaging techniques capable of providing improved knowledge of the subsurface detail in areas with complex geologic structures are becoming increasingly important.

In a typical seismic survey, elastic (seismic) waves are propagated into the earth region of interest. The elastic waves may be generated by various types of sources such as dynamite, air guns, and hydraulic vibrators, situated along the earth's surface. As these waves propagate downward through the earth, portions of their energy are sent back to the earth's surface by reflection and refraction which occur whenever abrupt changes in impedance are encountered. The reflected and/or refracted seismic waves are recorded at the earth's surface or in wellbores by an array of receivers such as geophones, hydrophones, or other similar devices. The underlying earth structure can be imaged by appropriate processing of the signals returned to the receivers.

Raw seismic data as recorded are generally not readily interpretable. While such data show the existence of formation interfaces, raw data do not accurately inform the interpreter as to the location of these interfaces. The process of migration, also called imaging, repositions the seismic data so that a more accurate picture of subsurface reflectors is given. In order to perform migration calculations, the seismic velocities of the subsurface at a multitude of points are first determined, commonly by performing migration velocity analysis (MVA). A two- or three-dimensional spatial distribution of subsurface velocity forms a velocity model for the subsurface region of interest. A large-scale velocity model covering the extent of the seismic data acquisition volume can be a complicated structure with vertically and laterally varying velocity.

Prior to imaging, it is often desirable to arrange data into a geometry different from the original data recording geometry. Such rearrangement or re-gridding may be desired in order to enhance the performance of given imaging algorithms, comply with physical requirements or assumptions of such imaging algorithms, for purposes of standardization or convenience, or for facilitating comparisons to other data sets.

Known methods of re-arranging seismic data include sorting, binning, dip moveout (DMO), partial stacking, offset continuation, and azimuth moveout (AMO). Sorting involves re-ordering the data along trace coordinates. Common sorting methods include CDP sorting, common offset sorting, common shot sorting, and common receiver sorting. Sorting does not fundamentaly change the character or nature of the data, and is not typically useful for filling-in data gaps. Binning involves re-assigning the coordinates of individual traces. The binning process may be extended to flex binning, a process in which multiple input traces may contribute to given output traces. Binning may also include amplitude normalization. A normal moveout correction may be performed prior to binning, in order to improve accuracy by handling first-order offset-dependent velocity variation effects. Inverse normal moveout can be applied after binning if such a correction is performed. Binning can be inaccurate in the presence of dipping geological strata, or when the binned grid differs substantially from the original grid. Moreover, binning may not adequately preserve diffractions. Partial stacking includes performing normal moveout of the data, and then stacking the data over predefined offset ranges. The data are inverse-normal-moveout corrected to generate data along a new output grid. Partial stacking can be inaccurate in the presence of significant lateral velocity variations and dipping geological strata.

Dip moveout (DMO) and partial migration operators have also been used to re-grid seismic data. Such methods change the fundamental nature of the seismic data. For further information on DMO see for example U.S. Pat. Nos. 4,878,204, 5,285,422, and 5,719,822. Offset continuation, another method of re-gridding seismic data, involves combining the forward and inverse DMO operators in two dimensions. For more information on offset continuation see for example the article by Bagaini et al., "2-D continuation operators and their applications," *Geophysics* 61(6): 1846–1858, 1996.

Azimuth moveout (AMO) combines the forward and inverse DMO operators in three dimensions, as described in the article by Biondi et al., "Azimuth Moveout for 3-D Prestack Imaging," *Geophysics* 63(2):574–588, 1998. AMO is a wave-equation correct re-gridding algorithm that handles dipping geological strata and variable velocity relatively accurately. Biondi et al's formulation of AMO is as an input-based superposition algorithm. The implementation requires input data to be sorted into constant-offset sections. For each input trace, an AMO surface is constructed. These AMO surfaces are superimposed to create the AMO-transformed output volume for a given output offset volume. For sampling and antialiasing reasons, their implementation also involves transforming the data coordinates to a processing coordinate system. For arbitrary collections of field data, Biondi et al.'s requirement of sorting into common offsets can be time consuming and cumbersome. The input-oriented approach can also be generally less efficient for most real data geometries.

SUMMARY

The present invention provides a method of re-gridding seismic data, comprising: establishing an input seismic data set corresponding to an input grid, the input data set comprising a plurality of input traces each corresponding to an input location; choosing an output grid comprising a plurality of output locations; and generating a re-gridded output seismic data set corresponding to the output grid, the output data set comprising a plurality of output traces corresponding to the plurality of output locations. Generating the output data set comprises performing output-based azimuth moveout to generate an output trace corresponding to each output location by: identifying a subset of input locations contributing to the output trace, the subset of input locations comprising a summation trajectory for the output trace, wherein at least one of the input locations along the summation trajectory has a different azimuth and midpoint from said each output location; computing a contribution of each of the input traces along the summation trajectory to the output trace; and summing the contribution of said each of the input traces into the output trace. The present invention further provides apparatus and computer-readable media encoding instructions to perform the methods described herein.

DESCRIPTION OF THE FIGURES

FIGS. 1-A through 1-C are schematic illustrations of hypothetical source and receiver positions for two marine surveys and a land survey.

FIGS. 5-A and 5-B illustrate a boxcar function and its Fourier transform, respectively.

FIGS. 6-A and 6-B illustrate a triangle function and its Fourier transform, respectively.

DETAILED DESCRIPTION

The following description illustrates the present invention by way of example and not necessarily by way of limitation. In the following description, unless specified otherwise, a location on a grid is understood to refer to a source/receiver pair. The term velocity will be understood to encompass both speeds and slownesses. As the skilled artisan will appreciate, it is understood that the equations disclosed herein are not changed by the mere use of other equivalent variables (e.g. velocity instead of slowness) to represent the same equation. Any reference to an element is understood to refer to at least one element. A set of elements is understood to include one or more elements.

Systems and methods of the present invention allow re-gridding seismic data. The data can be actual recorded data, processed data, or synthetically-generated data. Re-gridding seismic data as described below can be particularly useful for filling in gaps in land-based and marine surveys, and for regularizing the arrangement of sources and receivers in marine surveys, for example by removing cable feathering. Such re-gridding can also be used to achieve desired sampling spacings or geometries, or to improve the performance of seismic data processing algorithms that rely on certain data arrangement assumptions, or algorithms whose performance otherwise depends on the arrangement of sources and receivers corresponding to the input data. For example, data can be arranged to common azimuth in order to perform common azimuth migration, arranged onto a regular grid in order to perform shot-profile migration or any type of wave-equation migration algorithm that expects its input data to be regularly sampled. A re-gridding method as described below can also be used as a partial stacking operator to decimate the input data volume before input to Kirchhoff migration. For information on common azimuth migration see for example Biondi et al., "3-D prestack migration of common-azimuth data," Geophysics 61:1822–1832 (1996). For information on shot-profile migration see for example Resheff et al., "Migration of common shot gathers," Geophysics 51:324–331 (1986).

Figure 1:
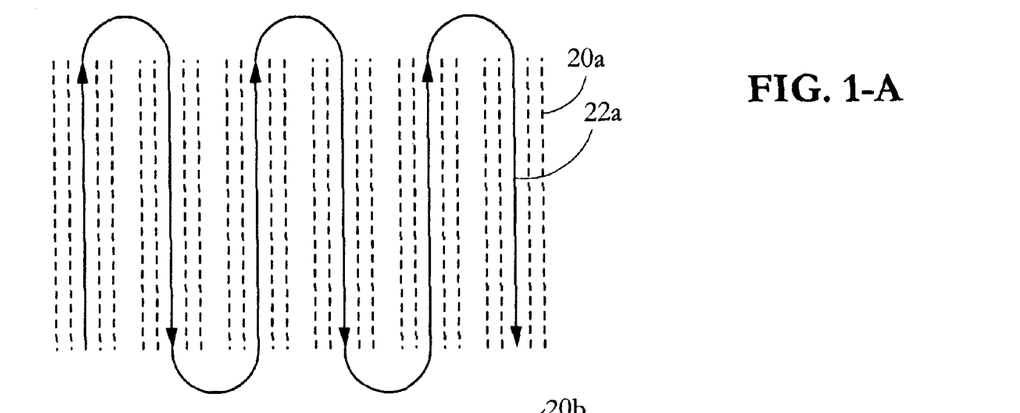

FIG. 1-A illustrates schematically a typical data acquisition arrangement for a marine seismic survey with sources and receivers along the water surface. A plurality of receivers $20a$ such as hydrophones are arranged in floating parallel lines over an area of interest. A ship towing lines of sources (shots) moves along the receiver lines, as illustrated by the ship trajectory $22a$. The sources are used to generate seismic events at different ship positions. The reflections of the events by the underlying earth structures are recorded at the various receivers.

FIG. 1-B shows a typical data acquisition arrangement for a marine seismic survey with receivers along the ocean bottom and sources along the water surface. A plurality of receivers $20b$ are arranged in lines along the ocean bottom along the area of interest. A ship towing lines of sources moves over the area of receivers $20b$, as illustrated by the ship trajectory $22b$. The ship may move perpendicularly or transversely relative to the receiver lines.

FIG. 1-A and FIG. 1-B show the sources and receivers in an idealized, regular pattern. In practice, the arrangement of receivers and sources is not perfectly regular or straight. Motion along the water surface, variations in ocean floor topography, or other factors may lead to deviations of the source/receiver arrangement from a regular or desired arrangement. For example, towed shot lines may have undulating or curved shapes, rather the straight shapes shown schematically in FIGS. 1-A and 1-B.

FIG. 1-C illustrates a land-based data acquisition arrangement having a gap 24 defined in array of receivers $20c$ and sources $22c$. Gap 24 may be due to the impracticality of disposing sources and receivers over topological features or obstacles disposed over the subsurface region of interest. A method of the present invention may be used to re-grid the data recorded using receivers $20c$ and sources $22c$ to a recording surface which includes source and receiver locations extending over gap 24.

Figure 2:
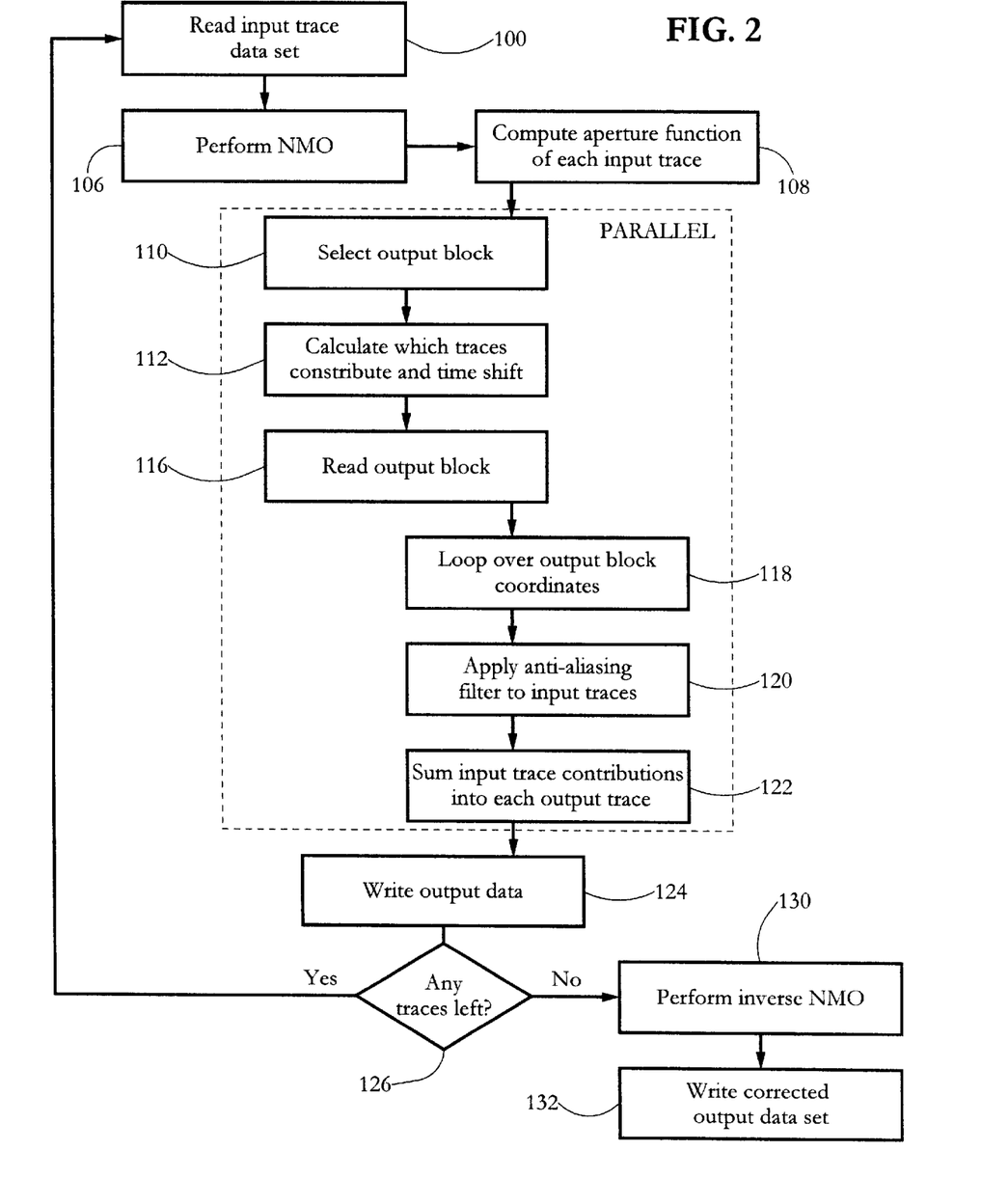
FIG. 2 is a flowchart showing the steps of a seismic data re-gridding method according to the preferred embodiment of the present invention.

FIG. 2 is a flowchart illustrating the steps of a presently preferred seismic data re-gridding method of the present invention. In a first step illustrated at 100, an input seismic data set for a seismic exploration volume of interest is made available in a storage medium. The seismic data set can include real data recorded on the earth's surface or within wells using geophones or hydrophones. The seismic data set can also include synthetic data corresponding to the earth's surface, to some underground surface or other locations. Synthetic data may be generated from real data, other synthetic data, velocity data, and/or petrophysical rock data.

Figure 4:
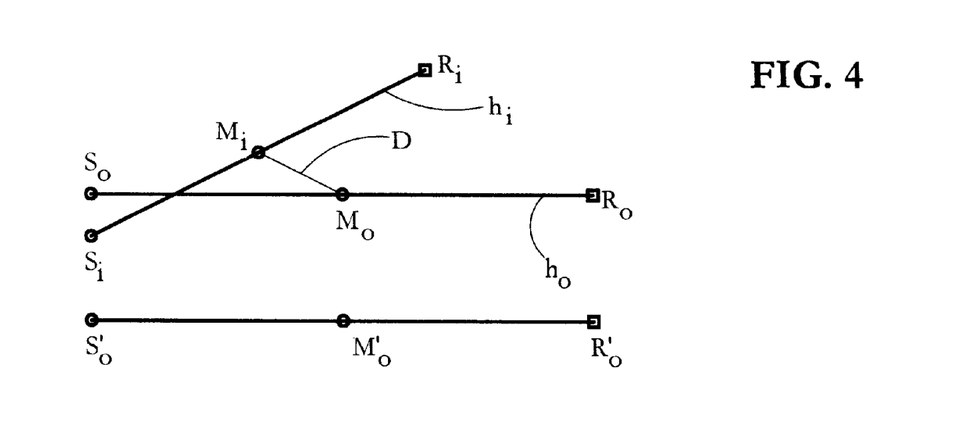
FIG. 4 shows exemplary source/receiver pairs defining an input location and two output locations.

The input data set comprises a plurality of traces, each corresponding to an input location. Each input location is defined by the positions of a corresponding source and receiver pair. The positions of a source and corresponding receiver are preferably represented by the grid coordinates of the source and receiver ($x_s$, $y_s$, $x_r$, $y_r$) defining the location, or by the coordinates of the midpoint and offset of the source and receiver. FIG. 4 illustrates an exemplary input source $S_i$ and corresponding input receiver $R_i$. The midpoint between source $S_i$ and receiver $R_i$ is denoted as $M_i$, while the offset vector extending from $M_i$ to $R_i$ is denoted as $h_i$. In general, a given input source/receiver pair may include a coinciding source and receiver.

After step 100, normal moveout (NMO) is performed on the input data set, as illustrated at 106 in FIG. 2. Normal moveout improves the accuracy of subsequent processing steps by handling first-order offset-dependent velocity variation effects. Normal moveout is a known trace-to-trace operation which transforms a trace having a non-zero offset into an equivalent zero-offset trace. The NMO-corrected zero-offset trace is the trace that would have been recorded using a coinciding source and receiver situated at the midpoint of the original trace, assuming a horizontal reflector. Each NMO-corrected input trace is generated by performing a first-order traveltime correction on a single uncorrected input trace, according to the relation:

$$t_{post-NMO} = \sqrt{t_{pre-NMO}^2 - \frac{4h^2}{v^2}} \quad [1]$$

where h denotes offset vector and v denotes velocity.

The NMO operation employs the input trace data block and a velocity model for the volume of interest to generate an NMO-corrected input trace data block. The velocity model is a 3-D array describing the distribution of velocities on a grid within the volume of interest. The grid is preferably a Cartesian (x-y-z) grid, although spherical, tetragonal, hexagonal or other grids may also be used. In a present implementation, a spatially-invariant RMS velocity is used in the NMO step 106. In other implementations, spatially-varying velocity models may be used in the NMO step. Such velocity models may exhibit velocity variations along the vertical direction ($V(z)$), or along all three directions ($V(x,y,z)$). Employing a spatially-varying velocity model in step 106 is generally more accurate but the same time more computationally intensive than using a spatially-invariant velocity.

In a subsequent step 108, an aperture function is computed for each input trace in the NMO-corrected input trace data set. The aperture function designates a plurality of output traces (or corresponding output locations) to which each input trace contributes. Computing an aperture function for each input trace is used to identify a set of output grid data blocks to which each input trace/location contributes. The aperture function computation is preferably performed in advance of other processing steps, to generate a table which lists the input traces contributing to each given output grid block.

Figure 3:
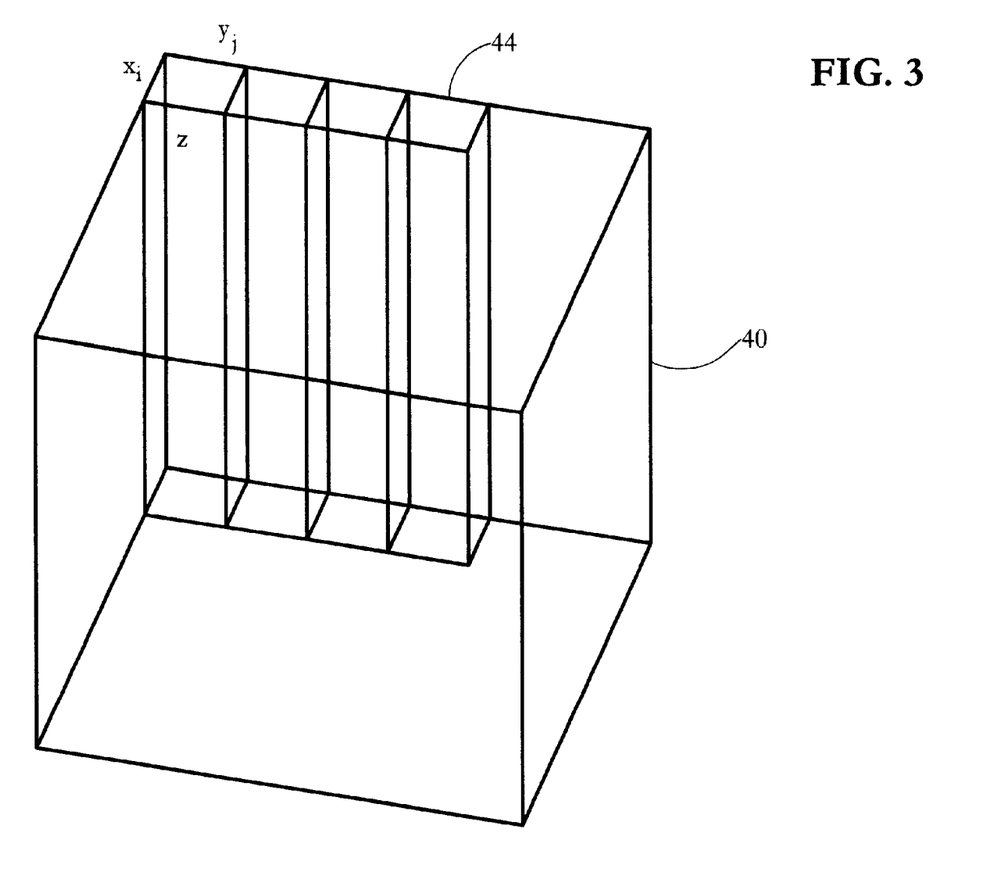
FIG. 3 illustrates a division of an output volume into output blocks according to the preferred embodiment of the present invention.

A number of subsequent method steps 110–122 are preferably performed in parallel on a parallel computer such as a Linux (Beowulf) cluster. The desired output grid is broken up into a plurality of output grid blocks, and each output grid block is assigned to one of the processors of the parallel computer. The computations performed for each output grid block are preferably independent from the computations performed for the other output grid blocks. FIG. 3 illustrates an exemplary division of an output Cartesian grid 40 into Cartesian output grid blocks 44. The vertical axis denotes time, while the horizontal axes denote the surface x- and y-directions. As illustrated, each output block 44 spans an x-y subsection of grid 40, and extends over the entire z-direction extent of grid 40. In alternative embodiments, each output block may extend over only part of the z-direction extent of the output grid. The block boundaries along the x- and y-directions may be delineated according to the midpoint, source, or receiver coordinates of the output locations. Generally, a non-cartesian block division may be employed.

In a step 110, each output grid block is assigned to a corresponding independent processor of the parallel computer. As will be apparent from the description below, the processing performed by each processor need not rely on processing performed by other processors. Moreover, each processor need not employ the entire input data set in its processing. A given processor may selectively access only the input traces which have been identified in step 108 as contributing to a corresponding output grid block.

In a subsequent step 112, for each output location (source/receiver pair) in a given output grid block, the input traces from the input data set that contribute to that output location are identified, and the contribution of each identified input trace to that output location is computed. The subset of input traces that contribute to a given output trace defines a region of validity for the summation trajectory for that output trace.

Consider an output location defined by an output source $S_o$ and an output receiver $R_o$, as shown in FIG. 4. The midpoint between source $S_o$ and receiver $R_o$ is denoted $M_o$. An offset vector $h_o$ defines the direction and separation between midpoint $M_o$ and receiver $R_o$ (or source $S_o$). The orientation of the offset vector is referred to as the azimuth of the output trace or location. The vector separating the input midpoint $M_i$ and the output midpoint $M_o$ is denoted as D. The D vector has an x-component $D_x$ and a y-component $D_y$. Plural output traces receive contributions from the input location ($S_i$, $R_i$), as illustrated by a second exemplary output source/receiver pair ($S'_o$, $R'_o$).

The set of input traces that contribute to a given output trace is localized around the output trace. For given input and output trace azimuths, the difference in midpoint coordinates ($D_x$, $D_y$) between the output trace and the contributing input traces is restricted to a parallelogram centered at the origin in ($D_x$, $D_y$) space, with the parallelogram sides defined by the input and output offset vectors $h_i$, $h_o$. Only input traces whose midpoint coordinates fall within that parallelogram can contribute to the output trace. The localization of the operator support input space facilitates the partitioning of the processing between independent parallel processors, where each parallel processor performs the required processing for a given output trace block.

Consider now an input trace and an output trace corresponding to the exemplary source/receiver locations ($S_i$, $R_i$) and ($S_o$, $R_o$) illustrated in FIG. 4. The input and output offset vectors and the midpoint difference vector can be represented in terms of their x- and y-coordinates as:

$$h_i = h_i(\cos\theta_i, \sin\theta_i),$$
$$h_o = h_o(\cos\theta_o, \sin\theta_o),$$
$$D = D(\cos\phi, \sin\phi), \quad [2]$$

where the unit x- and y-vectors denote the in-line and cross-line directions, respectively.

The contribution of the input trace corresponding to ($S_i$, $R_i$) to the output trace corresponding to ($S_o$, $R_o$) is preferably computed according to the relation $$t_0^2 = t_i \frac{h_o}{h_i} \left( \frac{h_i^2 \sin^2(\theta_i - \theta_o) - D^2 \sin^2(\theta_o - \phi)}{h_o^2 \sin^2(\theta_i - \theta_o) - D^2 \sin^2(\theta_i - \phi)} \right), \quad [3]$$

where the variables of Eq. [3] follow the convention of Eq. [2]. Eq. [3] maps an input trace event (amplitude) corresponding to an NMO-corrected time $t_i$ to an output trace event (amplitude) corresponding to an output time $t_o$. Eq. [3] is preferably used to generate a time-shift table describing the correspondence between all input and output traces of interest. The time-shift table implements the operator of Eq. [3]. The coordinates of each table entry include source and receiver identifiers corresponding to an input location, and an input time identifying a given event for that location. The source and receiver identifiers can be for example the x and y coordinates of the source and receiver, or the x and y coordinates of the midpoint and offset corresponding to the source/receiver pair. Each table entry includes an output time or time shift. Each table entry can also include a summation weight (e.g. a number between 0 and 1) to be assigned to that entry. The moveout or migration operator of eq. [3] defines a summation trajectory for each timepoint along an output trace. The input trace amplitudes along the summation trajectory are subsequently summed to generate an output trace amplitude at the given output timepoint of the output trace corresponding to the summation trajectory.

As shown in FIG. 2, an output data block to be updated is read from storage (e.g. disk) in a step 116. One output trace at a time from the selected output block is selected for updating, as illustrated at 118. Other output traces are selected for updating sequentially. The input traces that contribute to the selected output trace are retrieved from the time-shift table generated in step 112, and an anti-aliasing filter is applied to each input trace, as illustrated at 120. The anti-aliasing filter reduces the effect of operator aliasing, which occurs when a summation trajectory defined by the operator is so steep that cycle skips occur between spatial input locations.

For a local slope dt/dx of the summation trajectory, a grid spacing $\Delta x$, and a spatial Nyquist frequency $k_n = \frac{1}{2}\Delta x$, temporal frequencies above $$\omega = \frac{k_n}{dt/dx}, \qquad [4]$$

are aliased. For 2D signals characterized by a spatial sampling interval $\Delta \rho$, the maximum unaliased frequency is given by $$f_{max} = \frac{1}{2 \frac{\partial t}{\partial \rho} \Delta \rho} = \frac{1}{2 D \rho}. \qquad [5]$$

Equations [4] and [5] illustrate that operator aliasing is more likely to occur for higher-frequency energy, steeply dipping summation trajectories, and/or sparse input trace spatial sampling.

The derivative of eq. [5] can be calculated numerically or analytically by differentiating the operator of eq. [3]:

$$D\rho = \frac{\partial t}{d x_s} d x_s + \frac{\partial t}{d y_s} d y_s + \frac{\partial t}{d x_s} d x_r + \frac{\partial t}{d y_r} d y, \qquad [6]$$

where $(x_s, y_s, x_r, y_r)$ denote source and receiver coordinates, respectively. Expressions other than the exemplary one shown in eq. [6] may be used to compute the derivative of interest. For discrete spatial samplings, the spatial differentials of eq. [6] become the source/receiver grid spacings: $dx_s = \Delta x_s$, $dy_s = \Delta y_s$, $dx_r = \Delta x_r$, $dy_r = \Delta y_r$.

The maximum unaliased frequency at each timepoint of an input trace is a function of the local operator dip (slope of the summation trajectory). The maximum unaliased frequency decreases with increasing offset. The anti-aliasing filter applied to the input traces preferably varies spatially according to eq. [5].

Figure 5:
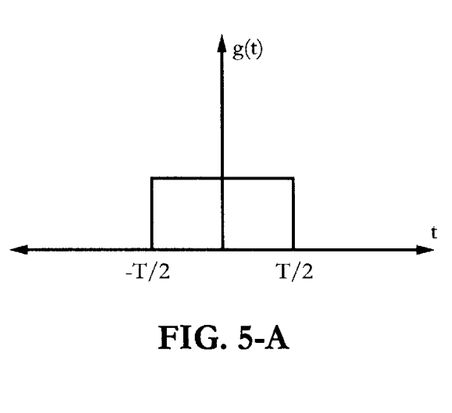
Figure 6:
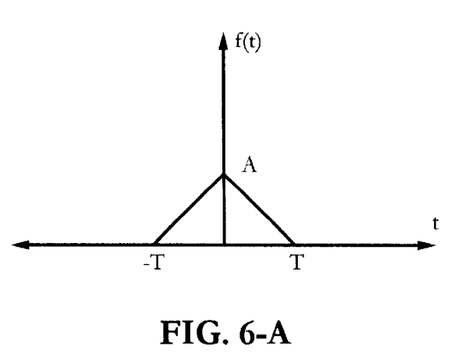

Suitable anti-aliasing filters include bandpass, boxcar, and triangle anti-aliasing filters. A lowpass anti-aliasing filter with the lowpass frequency given by eq. [5] is preferably applied. FIGS. 5-A and 5-B show an exemplary boxcar function and its Fourier transform, respectively. FIGS. 6-A and 6-B show an exemplary triangle function and its Fourier transform, respectively. At each timepoint along a trace, the function shape of FIG. 5-A or 6-A is convolved with the trace waveform around that timepoint. The length of the time-domain convolution operator, shown as T in FIGS. 5-A through 6-B, is chosen by setting the maximum unaliased frequency $f_{max}$ equal to the first spectral notch ($2\pi/T$) in the frequency-domain (Fourier) representation of the filter function. The length of the time-domain convolution operator increases with offset, as illustrated for a triangle filter in FIG. 7.

Figure 7:
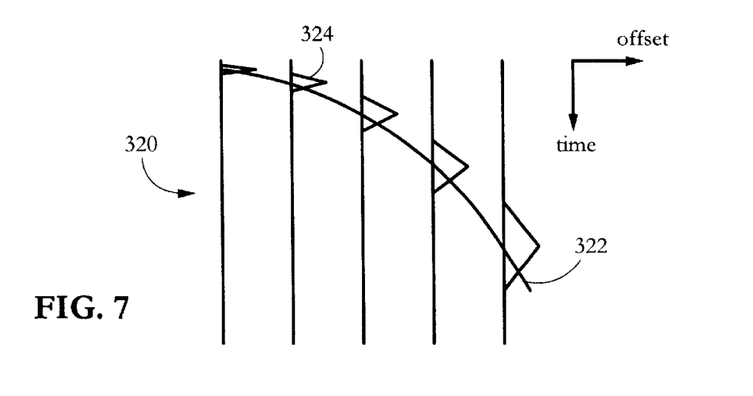
FIG. 7 illustrates the variation of a triangle anti-aliasing filter with offset.

FIG. 7 illustrates schematically a plurality of traces 320 arranged by offset, a summation trajectory 322 defining the contributions of traces 320 to a timepoint of an output location (not shown), and a plurality of triangle filter representations 324 each corresponding to an intersection between summation trajectory 322 and one of traces 320. The base lengths of triangle filter representations 324 increase with offset.

As shown in FIG. 2, after anti-aliasing is performed, the filtered input trace contributions are summed into the selected output trace value in a step 122. The sum of the input trace contributions may be a weighted or unweighted sum. A new output trace is then selected for updating (step 118). After all the output traces in the selected blocks are generated, the output traces are saved in an output file, as illustrated at 124.

As shown at 126, if more input traces are to be considered, a new input data set is read from storage (step 100) and the process described above is applied to the newly read input traces. If all input traces of interest have been considered, inverse NMO can be performed on the output traces, as shown at 130. Inverse NMO is a trace-by-trace operation that is the inverse of the NMO operation described above. Inverse NMO takes one zero-offset output trace at a time and generates an equivalent non-zero-offset output trace. After inverse NMO is performed, the final corrected output data set is written to storage (e.g. disk), as shown at 132.

It will be clear to one skilled in the art that the above embodiments may be altered in many ways without departing from the scope of the invention. For example, inverse NMO need not be necessarily applied. Accordingly, the scope of the invention should be determined by the following claims and their legal equivalents.

What is claimed is:
1. A method of re-gridding seismic data, comprising:
  performing normal moveout on an input data set to generate a corrected input data set comprising a plurality of input traces each corresponding to an input location along an input grid; and
  generating a re-gridded output seismic data set corresponding to an output grid comprising a plurality of output locations, the output data set comprising a plurality of output traces corresponding to the plurality of output locations, wherein generating the output data set comprises performing output-based azimuth moveout to generate an output trace corresponding to each output location by
    identifying a summation trajectory for the output trace, the summation trajectory comprising a subset of input locations contributing to the output trace, wherein at least one of the input locations along the summation trajectory has a different azimuth and midpoint from said each output location, computing a contribution of each of the input traces along the summation trajectory to the output trace, and summing the contribution of said each of the input traces into the output trace.

2. The method of claim 1, further comprising performing inverse normal moveout on the plurality of output traces after summing the contribution of said each of the input traces into the output trace.

3. The method of claim 1, further comprising:

dividing the output grid into a plurality of output grid blocks each comprising a subset of the plurality of output locations; and assigning each of the output grid blocks to one of a plurality of parallel processors.

4. The method of claim 1, further comprising a step of applying an anti-aliasing operator to the plurality of input traces prior to summing the contribution of said each of the input traces into the output trace.

5. The method of claim 1, wherein summing the contribution of said each of the input traces into the output trace comprises performing a weighted summation of said each of the input traces into the output trace.

6. The method of claim 1, further comprising performing migration on the output seismic data set.

7. The method of claim 1, further comprising performing Kirchhoff migration on the output seismic data set.

8. The method of claim 1, further comprising stacking the output seismic data set.

9. The method of claim 1, wherein the output grid defines a larger volume than the input grid.

10. The method of claim 1, wherein the output grid defines a smaller volume than the input grid.

11. The method of claim 1, wherein the input grid corresponds to a marine seismic survey geometry exhibiting cable feathering.

12. The method of claim 11, wherein the output grid corresponds to a cartesian array.

13. The method of claim 1, further comprising generating a subset of the input traces by interpolation.

14. A method of re-gridding seismic data comprising:

establishing an input seismic data set corresponding to an input grid, the input data set comprising a plurality of input traces each corresponding to an input location;

performing normal moveout on the plurality of input traces; and choosing an output grid comprising a plurality of output locations, the output grid being different from the input grid, the output grid comprising a plurality of output grid blocks each comprising a subset of the plurality of output locations;

assigning each of the output grid blocks to one of a plurality of parallel processors; and after performing normal moveout on the plurality of input traces, employing the plurality of parallel processors to generate a re-gridded output seismic data set corresponding to the output grid, the output data set comprising a plurality of output traces corresponding to the plurality of output locations, wherein generating the output data set comprises performing output-based azimuth moveout to generate an output trace corresponding to each output location by identifying a subset of input locations contributing to the output trace, the subset of input locations comprising a summation trajectory for the output trace, wherein at least one of the input locations along the summation trajectory has a different azimuth and midpoint from said each output location, computing a contribution of each of the input traces along the summation trajectory to the output trace, and summing the contribution of said each of the input traces into the output trace; and after summing the contribution of said each of the input traces into the output trace, performing inverse normal moveout on the plurality of output traces.

15. A computer programmed to perform a method of re-gridding seismic data comprising:

performing normal moveout on an input data set to generate a corrected input data set comprising a plurality of input traces each corresponding to an input location along an input grid; and generating a re-gridded output seismic data set corresponding to an output grid comprising a plurality of output locations, the output data set comprising a plurality of output traces corresponding to the plurality of output locations, wherein generating the output data set comprises performing output-based azimuth moveout to generate an output trace corresponding to each output location by identifying a summation trajectory for the output trace, the summation trajectory comprising a subset of input locations contributing to the output trace, wherein at least one of the input locations along the summation trajectory has a different azimuth and midpoint from said each output location, computing a contribution of each of the input traces along the summation trajectory to the output trace, and summing the contribution of said each of the input traces into the output trace.

16. A computer-readable medium encoding instructions to perform a method of re-gridding seismic data comprising:

performing normal moveout on an input data set to generate a corrected input data set comprising a plurality of input traces each corresponding to an input location along an input grid; and generating a re-gridded output seismic data set corresponding to an output grid comprising a plurality of output locations, the output data set comprising a plurality of output traces corresponding to the plurality of output locations, wherein generating the output data set comprises performing output-based azimuth moveout to generate an output trace corresponding to each output location by identifying a summation trajectory for the output trace, the summation trajectory comprising a subset of input locations contributing to the output trace, wherein at least one of the input locations along the summation trajectory has a different azimuth and midpoint from said each output location, computing a contribution of each of the input traces along the summation trajectory to the output trace, and summing the contribution of said each of the input traces into the output trace.

17. A seismic re-gridding apparatus comprising:

means for performing normal moveout on an input data set to generate a corrected input data set comprising a plurality of input traces each corresponding to an input location along an input grid; and means for generating a re-gridded output seismic data set corresponding to an output grid comprising a plurality of output locations, the output data set comprising a plurality of output traces corresponding to the plurality of output locations, wherein generating the output data set comprises performing output-based azimuth moveout to generate an output trace corresponding to each output location by
identifying a summation trajectory for the output trace, the summation trajectory comprising a subset of input locations contributing to the output trace, wherein at least one of the input locations along the summation trajectory has a different azimuth and midpoint from said each output location, computing a contribution of each of the input traces along the summation trajectory to the output trace, and summing the contribution of said each of the input traces into the output trace.

* * * * *